United States Patent
Jiang et al.

(10) Patent No.: US 9,947,065 B2
(45) Date of Patent: Apr. 17, 2018

(54) ZERO-WATERMARKING REGISTRATION AND DETECTION METHOD FOR HEVC VIDEO STREAMING AGAINST REQUANTIZATION TRANSCODING

(71) Applicant: Ningbo University, Ningbo, Zhejiang (CN)

(72) Inventors: Gangyi Jiang, Zhejiang (CN); Jing Wang, Zhejiang (CN); Mei Yu, Zhejiang (CN); Fen Chen, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 44 days.

(21) Appl. No.: 15/045,256

(22) Filed: Feb. 17, 2016

(65) Prior Publication Data

US 2017/0109858 A1 Apr. 20, 2017

(30) Foreign Application Priority Data

Oct. 15, 2015 (CN) .......................... 2015 1 0664347

(51) Int. Cl.
| | |
|---|---|
| *G06K 9/00* | (2006.01) |
| *G06T 1/00* | (2006.01) |
| *H04N 19/467* | (2014.01) |
| *H04N 19/40* | (2014.01) |

(52) U.S. Cl.
CPC ............ *G06T 1/0028* (2013.01); *H04N 19/40* (2014.11); *H04N 19/467* (2014.11)

(58) Field of Classification Search
CPC ..... G06T 1/0028; H04N 19/40; H04N 19/467

USPC ....... 382/100, 107, 124; 455/556.1; 715/863
See application file for complete search history.

(56) References Cited

U.S. PATENT DOCUMENTS

| | | | |
|---|---|---|---|
| 7,174,031 B2* | 2/2007 | Rhoads ................... | G06Q 30/02 382/107 |
| 8,160,304 B2* | 4/2012 | Rhoads ................... | G06F 3/017 382/107 |
| 2009/0220070 A1* | 9/2009 | Picard ..................... | G06T 1/0028 380/28 |
| 2009/0226030 A1* | 9/2009 | Picard ..................... | G06T 1/0028 382/100 |

(Continued)

*Primary Examiner* — Aaron W Carter (57) ABSTRACT

A zero-watermarking registration and detection method for HEVC video streaming against requantization transcoding is provided. To increase an attack-resistance of a registration watermarking, the registration method firstly processes depth values corresponding to respective brightness blocks in a target video streaming with a depth binarization during constructing registration watermarking information through depth features, because the depth binarization well reflects a robustness of the registration watermarking. A first watermarking information matrix including a part of the depth values after the depth binarization is encrypted with a random matrix, so as to increase a safety of the registration watermarking. The registration method directly generates zero-watermarking through the depth features of the video streaming without modifying original carrier information and affecting a watermarking transparency. Meanwhile, the registration method has a strong robustness against attacks, such as the requantization transcoding of quantization parameters within a certain range of variation and common signal processing.

2 Claims, 5 Drawing Sheets

(56) References Cited

U.S. PATENT DOCUMENTS

| | | | |
|---|---|---|---|
| 2010/0150394 A1* | 6/2010 | Bloom | G06T 1/0035 382/100 |
| 2016/0381389 A1* | 12/2016 | Jiang | H04N 19/593 375/240.12 |
| 2017/0109858 A1* | 4/2017 | Jiang | G06T 1/0028 |
| 2017/0374347 A1* | 12/2017 | Jiang | H04N 13/0048 |

* cited by examiner

ZERO-WATERMARKING REGISTRATION AND DETECTION METHOD FOR HEVC VIDEO STREAMING AGAINST REQUANTIZATION TRANSCODING

CROSS REFERENCE OF RELATED APPLICATION

The application claims priority under 35 U.S.C. 119(a-d) to CN 201510664347.0, filed Oct. 15, 2015.

BACKGROUND OF THE PRESENT INVENTION

Field of Invention

The present invention relates to a video zero-watermarking technology, and more particularly to a zero-watermarking registration and detection method for high efficiency video coding (HEVC) video streaming against requantization transcoding.

Description of Related Arts

The demands of people on the video gradually develop toward the high definition and the high quality. In order to adapt to the development trend, the video coding joint tram including the ITU Telecommunication Standardization Sector (ITU-T) video coding experts group and the International Organization for Standardization/International Electrotechnical Commission (ISO/IEC) moving picture experts group cooperatively developed the HEVC standard which was officially released in 2013 and has been widely applied in the various video operators. However, with the maturing of the multi-media and network technology, it is easier to obtain and process the video, and the pirate phenomenon is increasingly more serious. The digital watermarking technology is able to effectively authenticate the video and provide a copyright protection for the video. Thus, the research on the watermarking algorithm of the HEVC video streaming shows a great significance.

The high-definition video has an enormous data volume. It is inevitable to compress the high-definition video for saving the bandwidth and the memory space. The watermarking method based on the original video cannot be directly applied for the compressed video. Thus, the watermarking algorithm in the compressed domain is worth researching. Currently, the research achievements on the watermarking for the HEVC compressed domain are still few. The conventional watermarking methods fail to resist the attack, such as the requantization transcoding, and mainly adopt the embedded watermarking which requires modifying the carrier content to embed the watermarking. However, compared with the H.264/Advanced Video Coding (H.264/AVC), the HEVC is able to decrease the bit rate by about 50% at a similar perception quality. The high compression ratio challenges the balance between the robustness and the transparency of the embedded watermarking algorithm. The zero-watermarking technology constructs the watermarking information merely with the important features of the original carrier, without modifying the original carrier, and is able to solve the degradation problem of the high-definition video caused by modifying the data of the HEVC video streaming. Since the zero-watermarking was proposed, the zero-watermarking has been applied in the content safety protection for the various information carriers, such as the images, the videos and the audios. However, the research on the zero-watermarking algorithm for the video compressed domain has been rarely reported.

SUMMARY OF THE PRESENT INVENTION

An object of the present invention is to provide a zero-watermarking registration and detection method for HEVC video streaming against requantization transcoding, which has a strong robustness against attacks, such as the requantization transcoding of a quantization parameter (QP) within a certain range of variation and common signal processing, without modifying data of an original carrier.

Technical solutions of the present invention are described as follows.

A zero-watermarking registration method for HEVC video streaming against requantization transcoding comprises steps of:

①_1, at a watermarking registration port, compressing and coding an original video $V_{org}$ which is to be protected and has a resolution of M×N through an HEVC standard coding platform, so as to obtain a first target video streaming denoted as $str.bin_{org}$; arranging a first set D, and letting an initial value of the D be empty;

①_2, parsing each video frame of the $str.bin_{org}$, and defining an fth video frame to be parsed currently in the $str.bin_{org}$ as a first current frame, wherein: the f is an integer and has an initial value of 1; $1 \leq f \leq F$; and the F represents a total frame number of the video frames in the $str.bin_{org}$;

①_3, parsing each coding tree unit (CTU) of the first current frame, and defining a bth CTU to be parsed currently in the first current frame as a first current parsing block, wherein: the b is the integer and has the initial value of 1; $1 \leq b \leq B$; and the B represents a total number of the CTUs in the first current frame;

①_4, taking a brightness block having a size of 4×4 as a unit, orderly parsing out a depth value corresponding to each brightness block in the first current parsing block; and denoting the depth value corresponding to a kth brightness block in the first current parsing block as $d_{org}^k$, wherein: the k is the integer and has the initial value of 1; $1 \leq k \leq 256$; and $d_{org}^k \in \{0,1,2,3\}$;

①_5, letting b=b+1, taking a next CTU to be parsed in the first current frame as the first current parsing block, and returning back to the step ①_4 to continue executing until all of the CTUs in the first current frame are parsed; and then executing step ①_6; wherein the "=" in b=b+1 is an assignment symbol;

①_6, letting f=f+1, taking a next video frame to be parsed in the $str.bin_{org}$ as the first current frame, and returning back to the step ①_3 to continue executing until all of the video frames in the $str.bin_{org}$ are parsed; and then executing step ①_7; wherein the "=" in f=f+1 is the assignment symbol;

①_7, orderly storing the respective depth value corresponding to each brightness block in the $str.bin_{org}$ into the D; and processing values of all elements in the D with a depth binarization, so as to obtain a second set denoted as D', wherein a total number of the elements in the D is S, S=F×B×256;

①_8, converting a copyright logo image $logo_{org}$ having a resolution of X×Y into a binary image denoted as $logo_{org}'$; and processing the $logo_{org}'$ with chaotic scrambling to obtain an image denoted as $logo_{org}''$; wherein $1 \leq X \times Y \leq F \times B \times 256$;

①_9, extracting X×Y elements from the D' according to a preset rule; orderly arranging the extracted X×Y elements into a first watermarking information matrix having a size of X×Y with a Zig-Zag scanning order; meanwhile, randomly generating a random matrix having the size of X×Y, wherein each element in the random matrix has a value of 0 or 1, and denoting the random matrix as $R_{org}$; processing a value of each element in the first watermarking information matrix and the value of the corresponding element in the $R_{org}$ with XOR, so as to obtain a first matrix which serves as a first encrypted watermarking information matrix, denoted as D*; and ①_10, processing a value of each element in the $logo_{org}$" and a value of a corresponding element in the D* with XOR, so as to obtain a second matrix which serves as registration watermarking information, denoted as $W_{org}$; requesting a time certification authority to create a timestamp on the $W_{org}$, so as to obtain timestamped registration watermarking information denoted as $W_{org}$'; registering the $W_{org}$' in an Intellectual Property Right (IPR) database which is established by a trusted third party, and meanwhile sending the $logo_{org}$', the $R_{org}$ and the preset rule to a watermarking detection port.

Preferably, in the step ①_7, the step of "processing values of all elements in the D with a depth binarization" comprises steps of:

①_7a, dividing the D into four subsets, respectively denoted as $G_0$, $G_1$, $G_2$ and $G_3$, wherein: the $G_0$ is a first subset orderly extracting all the elements having the value of 0 from the D; the $G_1$ is a second subset orderly extracting all the elements having the value of 1 from the D; the $G_2$ is a third subset orderly extracting all the elements having a value of 2 from the D; and the $G_3$ is a fourth subset orderly extracting all the elements having a value of 3 from the D;

①_7b, dividing the four subsets into two depth value sets in three different grouping manners, wherein:

a first group is denoted as $C_1$, $C_1=\{F_1^1=G_0, F_2^1=G_1\cup G_2\cup G_3\}$, wherein the $F_1^1$ represents a first depth value set in a first grouping manner; the $F_2^1$ represents a second depth value set in the first grouping manner; and the symbol "∪" is a union operational symbol;

a second group is denoted as $C_2$, $C_2=\{F_1^2=G_0\cup G_1, F_2^2=G_2\cup G_3\}$, wherein the $F_1^2$ represents a first depth value set in a second grouping manner; and the $F_2^2$ represents a second depth value set in the second grouping manner; and a third group is denoted as $C_3$, $C_3=\{F_1^3=G_0\cup G_1\cup G_2, F_2^3=G_3\}$, wherein the $F_1^3$ represents a first depth value set in a third grouping manner; and the $F_2^3$ represents a second depth value set in the third grouping manner; and ①_7c, adaptively choosing one group from the $C_1$, the $C_2$ and the $C_3$ mapping values of all the elements in the first depth value set of the chosen group into watermarking information "0"; and mapping values of all the elements in the second depth value set of the chosen group into watermarking information "1", so as to finish processing the values of all the elements in the D with the depth binarization.

Preferably, in the step ①_7c, the step of "adaptively choosing one group from the $C_1$, the $C_2$ and the $C_3$" comprises steps of:

1_1), counting total numbers of the elements respectively in the $G_0$, the $G_1$, the $G_2$ and the $G_3$, respectively denoted as $S_0$, $S_1$, $S_2$ and $S_3$;

1-2), respectively calculating ratios of the $S_0$, the $S_1$, the $S_2$ and the $S_3$ to the S, respectively denoted as $P_0$, $P_1$, $P_2$ and $P_3$, wherein:

$$P_0 = \frac{S_0}{S}; P_1 = \frac{S_1}{S}; P_2 = \frac{S_2}{S}; \text{ and } P_3 = \frac{S_3}{S};$$

1_3), letting $P_{diff}(C_1)=|P_0-(P_1+P_2+P_3)|$, $P_{diff}(C_2)=|(P_0+P_1)-(P_2+P_3)|$, and $P_{diff}(C_3)=|(P_0+P_1+P_2)-P_3|$; wherein the symbol "||" is an absolute value symbol;

1_4), letting $C=C_2$; determining whether $P_{diff}(C)$ is larger than the $P_{diff}(C_3)$; if the $P_{diff}(C)$ is larger than the $P_{diff}(C_3)$, letting $C=C_3$, and then executing step 1-5); otherwise, remaining the C unchanged, and then executing the step 1-5); wherein the "=" in $C=C_3$ is the assignment symbol;

1-5) determining whether the $P_{diff}(C)$ is larger than a first threshold T; if the $P_{diff}(C)$ is larger than the first threshold T, executing step 1-6); otherwise, remaining the C unchanged, and adopting the C as a first final chosen group; and 1-6), determining whether the $P_{diff}(C)$ is larger than or equal to the $P_{diff}(C_1)$; if the $P_{diff}(C)$ is larger than or equal to the $P_{diff}(C_1)$, letting $C=C_1$, and adopting the C as the first final chosen group; otherwise, remaining the C unchanged, and adopting the C as the first final chosen group; wherein the "=" in $C=C_1$ is the assignment symbol.

Preferably, the first threshold T in the step 1-5) has a value of 0.4.

A zero-watermarking detection method for the HEVC video streaming against the requantization transcoding, corresponding to the zero-watermarking registration method for the HEVC video streaming against the requantization transcoding, comprises steps of:

②_1, at the watermarking detection port, letting $V_{dec}$ denote an HEVC video to be detected which has the resolution of M×N and is compressed and coded through the HEVC standard coding platform; letting an obtained corresponding video streaming be a second target video streaming, denoted as $str.bin_{dec}$; arranging a third set $\hat{D}$, and letting an initial value of the $\hat{D}$ be empty;

②_2, parsing each video frame of the $str.bin_{dec}$, and defining an f'th video frame to be parsed currently in the $str.bin_{dec}$ as a second current frame, wherein: the f' is the integer and has the initial value of 1; 1≤f'≤F'; the F' represents a total frame number of the video frames in the $str.bin_{dec}$; and the F' is equal to the F;

②_3, parsing each CTU of the second current frame, and defining a b'th CTU to be parsed currently in the second current frame as a second current parsing block, wherein: the b' is the integer and has the initial value of 1; 1≤b'≤B'; and the B' represents a total number of the CTUs in the second current frame;

②_4, taking the brightness block having the size of 4×4 as the unit, orderly parsing out a depth value corresponding to each brightness block in the second current parsing block; and denoting the depth value corresponding to a kth brightness block in the second current parsing block as $d_{dec}^k$, wherein: the k is the integer and has the initial value of 1; 1≤k≤256; and $d_{dec}^k \in \{0,1,2,3\}$;

②_5, letting b'=b'+1, taking a next CTU to be parsed in the second current frame as the second current parsing block, and returning back to the step ②_4 to continue executing until all of the CTUs in the second current frame are parsed; and then executing step ②_6; wherein the "=" in b'=b'+1 is the assignment symbol;

②_6, letting f'=f'+1, taking a next video frame to be parsed in the $str.bin_{dec}$ as the second current frame, and returning back to the step ②_3 to continue executing until all of the video frames in the $str.bin_{dec}$ are parsed; and then executing step ②_7; wherein the "=" in f'=f'+1 is the assignment symbol;

②_7, orderly storing the respective depth value corresponding to each brightness block in the $str.bin_{dec}$ into the $\hat{D}$; and processing values of all elements in the $\hat{D}$ with the depth binarization, so as to obtain a fourth set denoted as $\hat{D}'$, wherein a total number of the elements in the $\hat{D}$ is S', S'=F'×B'×256;

②_8, according to the preset rule which is sent to the watermarking detection port from the watermarking registration port, extracting X×Y elements from the $\hat{D}'$; orderly arranging the extracted X×Y elements into a second watermarking information matrix having the size of X×Y with the Zig-Zag scanning order; processing a value of each element in the second watermarking information matrix and the value of the corresponding element in the $R_{org}$ which is sent to the watermarking detection port from the watermarking registration port with XOR, so as to obtain a third matrix which serves as a second encrypted watermarking information matrix, denoted as $\hat{D}^*$; wherein 1≤X×Y≤F'×B'×256;

②_9, processing a value of each element in the $\hat{D}^*$ and a value of a corresponding element in the $W_{org}'$ of the IPR database which is established by the trusted third party with XOR, so as to obtain a fourth matrix which serves as copyright logo information, denoted as $logo_{dec}''$; and processing the $logo_{dec}''$ with chaotic anti-scrambling to obtain an image denoted as $logo_{dec}'$; and ②_10, comparing the $logo_{dec}'$ with the $logo_{org}'$ which is sent to the watermarking detection port from the watermarking registration port; if the $logo_{dec}'$ and the $logo_{org}'$ are consistent, finishing a copyright authentication.

Preferably, in the step ②_7, the step of "processing values of all elements in the $\hat{D}$ with the depth binarization" comprises steps of:

②_7a, dividing the $\hat{D}$ into four subsets, respectively denoted as $\hat{G}_0$, $\hat{G}_1$, $\hat{G}_2$ and $\hat{G}_3$, wherein: the $\hat{G}_0$ is a fifth subset orderly extracting all the elements having the value of 0 from the $\hat{D}$; the $\hat{G}_1$ is a sixth subset orderly extracting all the elements having the value of 1 from the $\hat{D}$; the $\hat{G}_2$ is a seventh subset orderly extracting all the elements having the value of 2 from the $\hat{D}$; and the $\hat{G}_3$ is an eighth subset orderly extracting all the elements having the value of 3 from the $\hat{D}$;

②_7b, dividing the four subsets into two depth value sets in three different grouping manners, wherein:

a fourth group is denoted as $\hat{C}_1$, $\hat{C}_1=\{\hat{F}_1^1=\hat{G}_0, \hat{F}_2^1=\hat{G}_1\cup\hat{G}_2\cup\hat{G}_3\}$, wherein: the $\hat{F}_1^1$ represents a first depth value set in a fourth grouping manner; the $\hat{F}_2^1$ represents a second depth value set in the fourth grouping manner; and the symbol "∪" is the union operational symbol;

a fifth group is denoted as $\hat{C}_2$, $\hat{C}_2=\{\hat{F}_1^2=\hat{G}_0\cup\hat{G}_1, \hat{F}_2^2=\hat{G}_2\cup\hat{G}_3\}$, wherein: the $\hat{F}_1^2$ represents a first depth value set in a fifth grouping manner; and the $\hat{F}_2^2$ represents a second depth value set in the fifth grouping manner; and a sixth group is denoted as $\hat{C}_3$, $\hat{C}_3=\{\hat{F}_1^3=\hat{G}_0\cup\hat{G}_1\cup\hat{G}_2, \hat{F}_2^3=\hat{G}_3\}$, wherein: the $\hat{F}_1^3$ represents a first depth value set in a sixth grouping manner; and the $\hat{F}_2^3$ represents a second depth value set in the sixth grouping manner; and ②_7c, adaptively choosing one group from the $\hat{C}_1$, the $\hat{C}_2$ and the $\hat{C}_3$; mapping values of all the elements in the first depth value set of the chosen group into the watermarking information "0"; and mapping values of all the elements in the second depth value set of the chosen group into the watermarking information "1", so as to finish processing the values of all the elements in the $\hat{D}$ with the depth binarization.

Preferably, in the step ②_7c, the step of "adaptively choosing one group from the $\hat{C}_1$, the $\hat{C}_2$ and the $\hat{C}_3$" comprises steps of:

2_1), counting total numbers of the elements respectively in the $\hat{G}_0$, the $\hat{G}_1$, the $\hat{G}_2$ and the $\hat{G}_3$, respectively denoted as $\hat{S}_0$, $\hat{S}_1$, $\hat{S}_2$ and $\hat{S}_3$;

2-2), respectively calculating ratios of the $\hat{S}_0$, the $\hat{S}_1$, the $\hat{S}_2$ and the $\hat{S}_3$ to the S', respectively denoted as $\hat{P}_0$, $\hat{P}_1$, $\hat{P}_2$ and $\hat{P}_3$, wherein:

$$\hat{P}_0 = \frac{\hat{S}_0}{S'}; \hat{P}_1 = \frac{\hat{S}_1}{S'}; \hat{P}_2 = \frac{\hat{S}_2}{S'}; \text{ and } \hat{P}_3 = \frac{\hat{S}_3}{S'};$$

2_3), letting $P_{diff}(\hat{C}_1)=|\hat{P}_0-(\hat{P}_1+\hat{P}_2+\hat{P}_3)|$, $P_{diff}(\hat{C}_2)=(\hat{P}_0+\hat{P}_1)-(\hat{P}_2+\hat{P}_3)|$, and $P_{diff}(\hat{C}_3)=|(\hat{P}_0+\hat{P}_1+\hat{P}_2)-\hat{P}_3|$; wherein the symbol "|" is the absolute value symbol;

2_4), letting $\hat{C}=\hat{C}_2$; determining whether $P_{diff}(\hat{C})$ is larger than the $P_{diff}(\hat{C}_3)$; if the $P_{diff}(\hat{C})$ is larger than the $P_{diff}(\hat{C}_3)$, letting $\hat{C}=\hat{C}_3$, and then executing step 2-5); otherwise, remaining the $\hat{C}$ unchanged, and then executing the step 2-5); wherein the "=" in $\hat{C}=\hat{C}_3$ is the assignment symbol;

2-5) determining whether the $P_{diff}(\hat{C})$ is larger than a second threshold T'; if the $P_{diff}(\hat{C})$ is larger than the second threshold T', executing step 2-6); otherwise, remaining the $\hat{C}$ unchanged, and adopting the $\hat{C}$ as a second final chosen group; and 2-6), determining whether the $P_{diff}(\hat{C})$ is larger than or equal to the $P_{diff}(\hat{C}_1)$; if the $P_{diff}(\hat{C})$ is larger than or equal to the $P_{diff}(\hat{C}_1)$, letting $\hat{C}=\hat{C}_1$, and adopting the $\hat{C}$ as the second final chosen group; otherwise, remaining the $\hat{C}$ unchanged, and adopting the $\hat{C}$ as the second final chosen group; wherein the "=" in $\hat{C}=\hat{C}_1$ is the assignment symbol.

Preferably, the second threshold T' in the step 2-5) has the value of 0.4.

Compared with prior arts, the present invention has following advantages.

Firstly, by counting changes in the depth of coding units of a video sequence before and after the requantization transcoding, it is found that depth features have a good robustness. Thus, to increase an attack-resistance of the registration watermarking, the zero-watermarking registration method for the HEVC video streaming, provided by the present invention, processes the depth value corresponding to the respective brightness block in the target video streaming with the depth binarization during constructing the registration watermarking information with the depth features, because the depth binarization well reflects the robustness of the registration watermarking.

Secondly, the zero-watermarking registration method for the HEVC video streaming, provided by the present invention, encrypts the first watermarking information matrix which includes a part of the depth values after the depth binarization with the random matrix, so as to increase a safety of the registration watermarking.

Thirdly, the zero-watermarking registration method for the HEVC video streaming, provided by the present invention, directly generates zero-watermarking through the depth features of the video streaming, without modifying original carrier information and affecting a watermarking transparency.

Fourthly, the watermarking is able to be extracted blindly without a participation of the original video. Additionally, it is only necessary to decode the depth part of the HEVC video to be detected, needless of decoding the overall HEVC video, resulting in a low calculation complexity.

These and other objectives, features, and advantages of the present invention will become apparent from the following detailed description, the accompanying drawings, and the appended claims.

BRIEF DESCRIPTION OF THE DRAWINGS

FIG. 2b shows a binary image of FIG. 2a.

DETAILED DESCRIPTION OF THE PREFERRED EMBODIMENT

The present invention is further described with accompanying drawings and preferred embodiments.

First Preferred Embodiment

According to the first preferred embodiment of the present invention, a zero-watermarking registration method for HEVC video streaming against requantization transcoding is provided, wherein:

at a watermarking registration port, depth features of an original video to be protected are extracted and binarized into a watermarking;

then, in order to enhance a safety of a registration and a visual effect of the watermarking, the watermarking is encrypted; the encrypted watermarking and chaotically-scrambled copyright logo information are processed with XOR; and an obtained result of processing with XOR is a registration watermarking; and finally, in order to guarantee an uniqueness and an authority of the watermarking, a time certification authority is requested to create a timestamp on registration information, and timestamped registration information is registered in an IPR database which is established by a trusted third party.

Figure 1A:
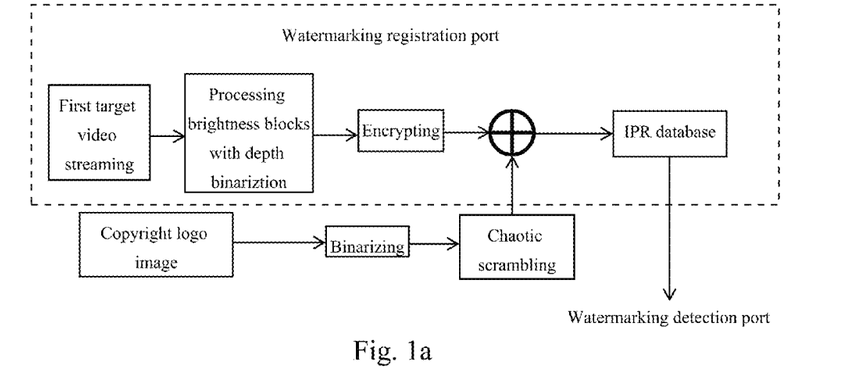
FIG. 1a shows an implementation block diagram of a zero-watermarking registration method according to a first preferred embodiment of the present invention.

FIG. 1a shows an implementation block diagram of the zero-watermarking registration method for the HEVC video streaming against the requantization transcoding according to the first preferred embodiment of the present invention.

The zero-watermarking registration method for the HEVC video streaming against the requantization transcoding comprises steps of:

①_1, at a watermarking registration port, compressing and coding an original video $V_{org}$ which is to be protected and has a resolution of M×N through an HEVC standard coding platform, so as to obtain a first target video streaming denoted as $str.bin_{org}$; arranging a first set D, and letting an initial value of the D be empty;

①_2, parsing each video frame of the $str.bin_{org}$, and defining an fth video frame to be parsed currently in the $str.bin_{org}$ as a first current frame, wherein: the f is an integer and has an initial value of 1; $1 \le f \le F$; and the F represents a total frame number of the video frames in the $str.bin_{org}$;

①_3, parsing each CTU of the first current frame, and defining a bth CTU to be parsed currently in the first current frame as a first current parsing block, wherein: the b is the integer and has the initial value of 1; $1 \le b \le B$; and the B represents a total number of the CTUs in the first current frame;

①_4, taking a brightness block having a size of 4×4 as a unit, orderly parsing out a depth value corresponding to each brightness block in the first current parsing block; and denoting the depth value corresponding to a kth brightness block in the first current parsing block as $d_{org}^k$, wherein: the k is the integer and has the initial value of 1; $1 \le k \le 256$; and $d_{org}^k \in \{0,1,2,3\}$;

①_5, letting b=b+1, taking a next CTU to be parsed in the first current frame as the first current parsing block, and returning back to the step ①_4 to continue executing until all of the CTUs in the first current frame are parsed; and then executing step ①_6; wherein the "=" in b=b+1 is an assignment symbol;

①_6, letting f=f+1, taking a next video frame to be parsed in the $str.bin_{org}$ as the first current frame, and returning back to the step ①_3 to continue executing until all of the video frames in the str.bin$_{org}$ are parsed; and then executing step ①_7; wherein the "=" in f=f+1 is the assignment symbol;

①_7, orderly storing the respective depth value corresponding to each brightness block in the str.bin$_{org}$ into the D; and processing values of all elements in the D with a depth binarization, so as to obtain a second set denoted as D', wherein a total number of the elements in the D is S, S=F×B×256; wherein: in the step ①_7, the step of "processing values of all elements in the D with a depth binarization" is embodied to comprise steps of:

①_7a, dividing the D into four subsets, respectively denoted as $G_0$, $G_1$, $G_2$ and $G_3$, wherein: the $G_0$ is a first subset orderly extracting all the elements having a value of 0 from the D; the $G_1$ is a second subset orderly extracting all the elements having a value of 1 from the D; the $G_2$ is a third subset orderly extracting all the elements having a value of 2 from the D; and the $G_3$ is a fourth subset orderly extracting all the elements having a value of 3 from the D;

①_7b, dividing the four subsets into two depth value sets in three different grouping manners, wherein:

a first group is denoted as $C_1$, $C_1 = \{F_1^1 = G_0, F_2^1 = G_1 \cup G_2 \cup G_3\}$, wherein: the $F_1^1$ represents a first depth value set in a first grouping manner; the $F_2^1$ represents a second depth value set in the first grouping manner; and the symbol "∪" is a union operational symbol;

a second group is denoted as $C_2$, $C_2 = \{F_1^2 = G_0 \cup G_1, F_2^2 = G_2 \cup G_3\}$, wherein: the $F_1^2$ represents a first depth value set in a second grouping manner; and the F represents a second depth value set in the second grouping manner; and a third group is denoted as $C_3$, $C_3 = \{F_1^3 = G_0 \cup G_1 \cup G_2, F_2^3 = G_3\}$, wherein: the $F_1^3$ represents a first depth value set in a third grouping manner; and the $F_2^3$ represents a second depth value set in the third grouping manner; and ①_7c, adaptively choosing one group from the $C_1$, the $C_2$ and the $C_3$ mapping values of all the elements in the first depth value set of the chosen group into watermarking information "0"; and mapping values of all the elements in the second depth value set of the chosen group into watermarking information "1", so as to finish processing the values of all the elements in the D with the depth binarization; wherein: in the step ①_7c, the step of "adaptively choosing one group from the $C_1$, the $C_2$ and the $C_3$" is embodied to comprise steps of:

1_1), counting total numbers of the elements respectively in the $G_0$, the $G_1$, the $G_2$ and the $G_3$, respectively denoted as $S_0$, $S_1$, $S_2$ and $S_3$;

1-2), respectively calculating ratios of the $S_0$, the $S_1$, the $S_2$ and the $S_3$ to the S, respectively denoted as $P_0$, $P_1$, $P_2$ and $P_3$ wherein:

$$P_0 = \frac{S_0}{S}; P_1 = \frac{S_1}{S}; P_2 = \frac{S_2}{S}; \text{ and } P_3 = \frac{S_3}{S};$$

Figure 2A:
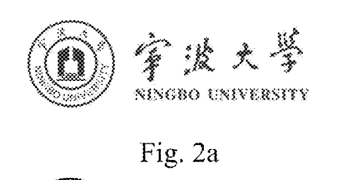
FIG. 2a shows a copyright logo image which is a "ningda" image having a resolution of 205×650 according to the first preferred embodiment of the present invention.
Figure 2B:
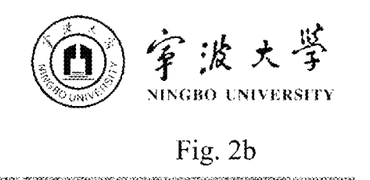

1_3), letting $P_{diff}(C_1) = |P_0 - (P_1 + P_2 + P_3)|$, $P_{diff}(C_2) = |(P_0 + P_1) - (P_2 + P_3)|$, and $P_{diff}(C_3) = |(P_0 + P_1 + P_2) - P_3|$; wherein the symbol "||" is an absolute value symbol;

1_4), letting C=$C_2$; determining whether $P_{diff}(C)$ is larger than the $P_{diff}(C_3)$; if the $P_{diff}(C)$ is larger than the $P_{diff}(C_3)$, letting C=$C_3$, and then executing step 1-5); otherwise, remaining the C unchanged, and then executing the step 1-5); wherein the "=" in C=$C_3$ is the assignment symbol;

1-5) determining whether the $P_{diff}(C)$ is larger than a first threshold T; if the $P_{diff}(C)$ is larger than the first threshold T, executing step 1-6); otherwise, remaining the C unchanged, and adopting the C as a first final chosen group; wherein: the first threshold T is embodied to have a value of 0.4; and 1-6), determining whether the $P_{diff}(C)$ is larger than or equal to the $P_{diff}(C_1)$; if the $P_{diff}(C)$ is larger than or equal to the $P_{diff}(C_1)$, letting C=$C_1$, and adopting the C as the first final chosen group; otherwise, remaining the C unchanged, and adopting the C as the first final chosen group; wherein the "=" in C=$C_1$ is the assignment symbol;

①_8, converting a copyright logo image logo$_{org}$ having a resolution of X×Y into a binary image denoted as logo$_{org}$'; and processing the logo$_{org}$' with chaotic scrambling to obtain an image denoted as logo$_{org}$"; wherein: 1≤X×Y≤F×B×256; the logo$_{org}$ is embodied to be a "ningda" image having a resolution of 205×650, as showed in FIG. 2a; the "ningda" image is a color image and has three channels; the "ningda" image is converted into the binary image logo$_{org}$', as showed in FIG. 2b; and processing the logo$_{org}$' with the chaotic scrambling is randomly disordering data in the binary image logo$_{org}$';

①_9, extracting X×Y elements from the D' according to a preset rule; orderly arranging the extracted X×Y elements into a first watermarking information matrix having a size of X×Y with a Zig-Zag scanning order; meanwhile, randomly generating a random matrix having the size of X×Y, wherein each element in the random matrix has the value of 0 or 1, and denoting the random matrix as R$_{org}$; processing a value of each element in the first watermarking information matrix and the value of the corresponding element in the R$_{org}$ with XOR, so as to obtain a first matrix which serves as a first encrypted watermarking information matrix, denoted as D*; wherein: the preset rule is embodied to be user-defined, such as extracting first X×Y elements from the D', extracting last X×Y elements from the D', extracting middle X×Y elements from the D', and extracting X×Y elements from the D' at intervals, while extracting in other manner is feasible; and the random matrix can be directly generated by a conventional tool, such as MATLAB and c++; and ①_10, processing a value of each element in the logo$_{org}$" and a value of a corresponding element in the D* with XOR, so as to obtain a second matrix which serves as registration watermarking information, denoted as W$_{org}$; requesting a time certification authority to create a timestamp on the W$_{org}$, so as to obtain timestamped registration watermarking information denoted as W$_{org}$'; registering the W$_{org}$' in an IPR database which is established by a trusted third party, and meanwhile sending the logo$_{org}$', the R$_{org}$ and the preset rule to a watermarking detection port; wherein the timestamp on the registration watermarking information W$_{org}$ is a registration time certification provided by the time certification authority and able to effectively confirm an ownership of work rights.

Second Preferred Embodiment

Figure 1B:
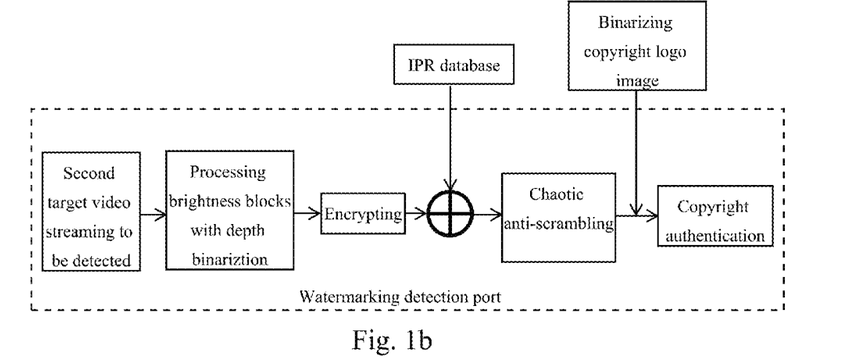
FIG. 1b shows an implementation block diagram of a zero-watermarking detection method according to a second preferred embodiment of the present invention.

According to the second preferred embodiment of the present invention, a zero-watermarking detection method for the HEVC video streaming against the requantization transcoding, corresponding to the zero-watermarking registration method for the HEVC video streaming against the requantization transcoding according to the first preferred embodiment of the present invention, is provided, and an implementation block diagram thereof is showed in FIG. 1b; wherein:

at the watermarking detection port, depth features of an HEVC video to be detected are firstly extracted, binarized, and encrypted with a saved key;

then, the depth features of the HEVC video and the registration watermarking information in the IPR database are processed with XOR; and finally, an obtained result after processing with XOR is processed with chaotic anti-scrambling, so as to confirm an ownership of a copyright.

FIG. 1b shows the implementation block diagram of the zero-watermarking detection method for the HEVC video streaming against the requantization transcoding according to the second preferred embodiment of the present invention.

The zero-watermarking detection method for the HEVC video streaming against the requantization transcoding comprises steps of:

②_1, at the watermarking detection port, letting $V_{dec}$ denote an HEVC video to be detected which has the resolution of M×N and is compressed and coded through the HEVC standard coding platform; letting an obtained corresponding video streaming be a second target video streaming, denoted as $str.bin_{dec}$; arranging a third set $\hat{D}$, and letting an initial value of the $\hat{D}$ be empty; wherein the resolution of the HEVC video $V_{dec}$ is embodied to be consistent with the resolution of the original video $V_{org}$;

②_2, parsing each video frame of the $str.bin_{dec}$, and defining an f'th video frame to be parsed currently in the $str.bin_{dec}$ as a second current frame, wherein: the f' is the integer and has the initial value of 1; $1 \le f' \le F'$; the F' represents a total frame number of the video frames in the $str.bin_{dec}$; and the F' is equal to the F;

②_3, parsing each CTU of the second current frame, and defining a b'th CTU to be parsed currently in the second current frame as a second current parsing block, wherein: the b' is the integer and has the initial value of 1; $1 \le b' \le B'$; and the B' represents a total number of the CTUs in the second current frame;

②_4, taking the brightness block having the size of 4×4 as the unit, orderly parsing out a depth value corresponding to each brightness block in the second current parsing block; and denoting the depth value corresponding to a kth brightness block in the second current parsing block as $d_{dec}^k$, wherein: the k is the integer and has the initial value of 1; $1 \le k \le 256$; and $d_{dec}^k \in \{0,1,2,3\}$;

②_5, letting b'=b'+1, taking a next CTU to be parsed in the second current frame as the second current parsing block, and returning back to the step ②_4 to continue executing until all of the CTUs in the second current frame are parsed; and then executing step ②_6; wherein the "=" in b'=b'+1 is the assignment symbol;

②_6, letting f'=f'+1, taking a next video frame to be parsed in the $str.bin_{dec}$ as the second current frame, and returning back to the step ②_3 to continue executing until all of the video frames in the $str.bin_{dec}$ are parsed; and then executing step ②_7; wherein the "=" in f'=f'+1 is the assignment symbol;

②_7, orderly storing the respective depth value corresponding to each brightness block in the $str.bin_{dec}$ into the $\hat{D}$; and processing values of all elements in the $\hat{D}$ with the depth binarization, so as to obtain a fourth set denoted as $\hat{D}'$, wherein a total number of the elements in the $\hat{D}$ is S', S'=F'×B'×256; wherein: in the step ②_7, the step of "processing values of all elements in the $\hat{D}$ with the depth binarization" is embodied to comprise steps of:

2_7a, dividing the $\hat{D}$ into four subsets, respectively denoted as $\hat{G}_0$, $\hat{G}_1$, $\hat{G}_2$ and $\hat{G}_3$, wherein: the $\hat{G}_0$ is a fifth subset orderly extracting all the elements having the value of 0 from the $\hat{D}$; the $\hat{G}_1$ is a sixth subset orderly extracting all the elements having the value of 1 from the $\hat{D}$; the $\hat{G}_2$ is a seventh subset orderly extracting all the elements having the value of 2 from the $\hat{D}$; and the $\hat{G}_3$ is an eighth subset orderly extracting all the elements having the value of 3 from the D;

②_7b, dividing the four subsets into two depth value sets in three different grouping manners, wherein:

a fourth group is denoted as $\hat{C}_1$, $\hat{C}_1 = \{\hat{F}_1^1 = \hat{G}_0, \hat{F}_2^1 = \hat{G}_1 \cup \hat{G}_2 \cup \hat{G}_3\}$, wherein: the $\hat{F}_1^1$ represents a first depth value set in a fourth grouping manner; the $\hat{F}_2^1$ represents a second depth value set in the fourth grouping manner; and the symbol "∪" is the union operational symbol;

a fifth group is denoted as $\hat{C}_2$, $\hat{C}_2 = \{\hat{F}_1^2 = \hat{G}_0 \cup \hat{G}_1, \hat{F}_2^2 = \hat{G}_2 \cup \hat{G}_3\}$, wherein: the $\hat{F}_1^2$ represents a first depth value set in a fifth grouping manner; and the $\hat{F}_2^2$ represents a second depth value set in the fifth grouping manner; and a sixth group is denoted as $\hat{C}_3$, $\hat{C}_3 = \{\hat{F}_1^3 = \hat{G}_0 \cup \hat{G}_1 \cup \hat{G}_2, \hat{F}_2^3 = \hat{G}_3\}$, wherein: the $\hat{F}_1^3$ represents a first depth value set in a sixth grouping manner; and the $\hat{F}_2^3$ represents a second depth value set in the sixth grouping manner; and ②_7c, adaptively choosing one group from the $\hat{C}_1$, the $\hat{C}_2$ and the $\hat{C}_3$; mapping values of all the elements in the first depth value set of the chosen group into the watermarking information "0"; and mapping values of all the elements in the second depth value set of the chosen group into the watermarking information "1", so as to finish processing the values of all the elements in the $\hat{D}$ with the depth binarization; wherein: in the step ②_7c, the step of "adaptively choosing one group from the $\hat{C}_1$, the $\hat{C}_2$ and the $\hat{C}_3$" is embodied to comprise steps of:

2_1), counting total numbers of the elements respectively in the $\hat{G}_0$, the $\hat{G}_1$, the $\hat{G}_2$ and the $\hat{G}_3$, respectively denoted as $\hat{S}_0$, $\hat{S}_1$, $\hat{S}_2$ and $\hat{S}_3$;

2-2), respectively calculating ratios of the $\hat{S}_0$, the $\hat{S}_1$, the $\hat{S}_2$ and the $\hat{S}_3$ to the S', respectively denoted as $\hat{P}_0$, $\hat{P}_1$, $\hat{P}_2$ and $\hat{P}_3$, wherein:

$$\hat{P}_0 = \frac{\hat{S}_0}{S'}; \hat{P}_1 = \frac{\hat{S}_1}{S'}; \hat{P}_2 = \frac{\hat{S}_2}{S'}; \text{ and } \hat{P}_3 = \frac{\hat{S}_3}{S'};$$

2_3), letting $P_{diff}(\hat{C}_1) = |\hat{P}_0 - (\hat{P}_1 + \hat{P}_2 + \hat{P}_3)|$, $P_{diff}(\hat{C}_2) = |(\hat{P}_0 + \hat{P}_1) - (\hat{P}_2 + \hat{P}_3)|$, and $P_{diff}(\hat{C}_3) = |(\hat{P}_0 + \hat{P}_1 + \hat{P}_2) - \hat{P}_3|$; wherein the symbol "||" is the absolute value symbol;

2_4), letting $\hat{C} = \hat{C}_2$; determining whether $P_{diff}(\hat{C})$ is larger than the $P_{diff}(\hat{C}_3)$; if the $P_{diff}(\hat{C})$ is larger than the $P_{diff}(\hat{C}_3)$, letting $\hat{C} = \hat{C}_3$, and then executing step 2-5); otherwise, remaining the $\hat{C}$ unchanged, and then executing the step 2-5); wherein the "=" in $\hat{C} = \hat{C}_3$ is the assignment symbol;

2-5) determining whether the $P_{diff}(\hat{C})$ is larger than a second threshold T'; if the $P_{diff}(\hat{C})$ is larger than the second threshold T', executing step 2-6); otherwise, remaining the $\hat{C}$ unchanged, and adopting the $\hat{C}$ as a second final chosen group; wherein the second threshold T' is embodied to have the value of 0.4; and 2-6), determining whether the $P_{diff}(\hat{C})$ is larger than or equal to the $P_{diff}(\hat{C}_1)$; if the $P_{diff}(\hat{C})$ is larger than or equal to the $P_{diff}(\hat{C}_1)$, letting $\hat{C} = \hat{C}_1$, and adopting the $\hat{C}$ as the second final chosen group; otherwise, remaining the $\hat{C}$ unchanged, and adopting the $\hat{C}$ as the second final chosen group; wherein the "=" in $\hat{C} = \hat{C}_1$ is the assignment symbol;

②_8, according to the preset rule which is sent to the watermarking detection port from the watermarking registration port, extracting X×Y elements from the $\hat{D}'$; orderly arranging the extracted X×Y elements into a second watermarking information matrix having the size of X×Y with the Zig-Zag scanning order; processing a value of each element in the second watermarking information matrix and the value of the corresponding element in the $R_{org}$ which is sent to the watermarking detection port from the watermarking registration port with XOR, so as to obtain a third matrix which serves as a second encrypted watermarking information matrix, denoted as $\hat{D}^*$; wherein: $1 \le X \times Y \le F' \times B' \times 256$; the preset rule for extracting the second watermarking information matrix from the $\hat{D}'$ is embodied to be consistent with the preset rule for extracting at the watermarking registration port; values of the X and the Y are unchanged;

②_9, processing a value of each element in the $\hat{D}^*$ and a value of a corresponding element in the $W_{org}'$ of the IPR database which is established by the trusted third party with XOR, so as to obtain a fourth matrix which serves as copyright logo information, denoted as $logo_{dec}''$; and processing the $logo_{dec}''$ with chaotic anti-scrambling to obtain an image denoted as $logo_{dec}'$; and ②_10, comparing the $logo_{dec}'$ with the $logo_{org}'$ which is sent to the watermarking detection port from the watermarking registration port; if the $logo_{dec}'$ and the $logo_{org}'$ are consistent, finishing a copyright authentication.

In order to verify effectiveness and feasibility of the registration method and the corresponding detection method, the two methods of the present invention are tested.

Four test sequences, BasketballPass, ParkScene, PartyScene and Vidyol, are adopted, wherein the four test sequences have different resolutions, respectively 416×240, 1920×1080, 832×480 and 1280×720, and different texture complexities. According to the preferred embodiments of the present invention, a standard test coding platform HM15.0 is adopted; and a full frame intra coding is adopted, having a coding frame number of 100. From three aspects of an independence of a zero-watermarking, a robustness against a requantization transcoding attack of a coding QP within a certain range of variation, and the robustness against common signal processing combined with the requantization transcoding attack, the effectiveness of the two methods, provided by the present invention, is assessed according to PC of a watermarking extraction, $$PC = \frac{\sum_{f=1}^{F} \sum_{k=1}^{K} (w(f,k) e(f,k))}{F \times K},$$

wherein: the w(f,k) represents depth-binarized watermarking information of a kth brightness block in an fth frame of an original HEVC video after coding; the w'(f,k) represents depth-binarized watermarking information of a kth brightness block in an fth frame of an attacked HEVC video after recoding; the F is a total frame number of the video frames in the test sequence; the K is a total number of the brightness blocks in each video frame; and the symbol "⊙" is an XNOR symbol.

1) Independence of Zero-Watermarking

Figure 3A:
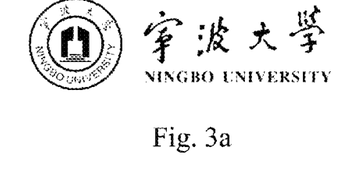
FIG. 3a shows a first final copyright logo image obtained from an unattacked PartyScene testing sequence which serves as an HEVC video to be detected according to the preferred embodiments of the present invention.
Figure 3B:
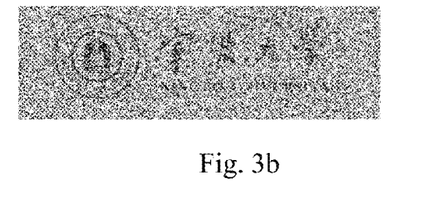
FIG. 3b shows a second final copyright logo image obtained from an unattacked BQMall testing sequence which serves as the HEVC video to be detected according to the preferred embodiments of the present invention.

The zero-watermarking is a specific characterization of a carrier, and thus the zero-watermarkings of the different video sequences are required to be mutually independent. Take the PartyScene test sequence and the BQMall test sequence as examples to test the independence of the zero-watermarking, both of the two test sequences have the resolution of 832×480. According to the zero-watermarking registration method provided by the present invention, the registration watermarking information of the PartyScene test sequence and the BQMall test sequence is obtained. FIG. 3a shows a first final copyright logo image obtained from the unattacked PartyScene test sequence which serves as the HEVC video to be detected. FIG. 3b shows a second final copyright logo image obtained from the unattacked BQMall test sequence which serves as the HEVC video to be detected. According to the obtained final copyright logo images, when the HEVC video to be detected is the same as an original registration video, the complete original copyright logo image is obtained; when the HEVC video to be detected is different from the original registration video, it is failed to obtain the original copyright logo image. Accordingly, the zero-watermarkings of the different video sequences are required to be mutually independent.

2) Robustness Against Requantization Transcoding

Figure 4A:
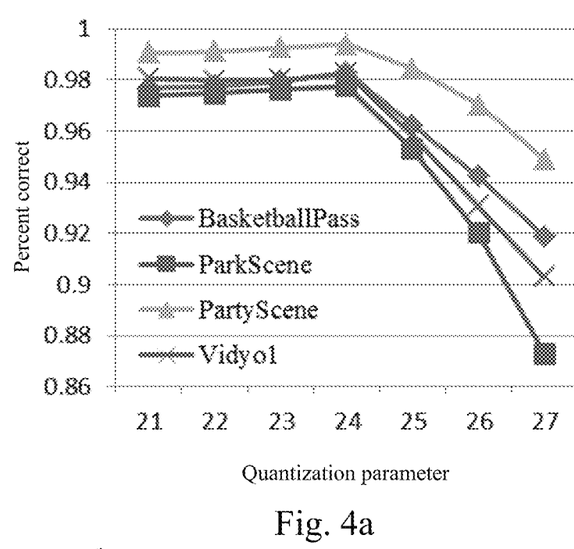
FIG. 4a shows a first percent correct (PC) curve diagram of a watermarking extraction of BasketballPass, ParkScene, PartyScene and Vidyol test sequences after a requantization transcoding attack when an original coding QP is 24 according to the preferred embodiments of the present invention.
Figure 4B:
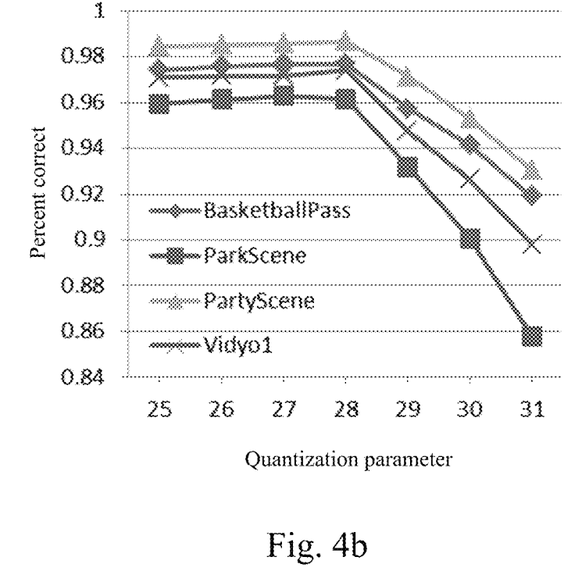
FIG. 4b shows a second PC curve diagram of the watermarking extraction of the BasketballPass, the ParkScene, the PartyScene and the Vidyol test sequences after the requantization transcoding attack when the original coding QP is 28 according to the preferred embodiments of the present invention.
Figure 4C:
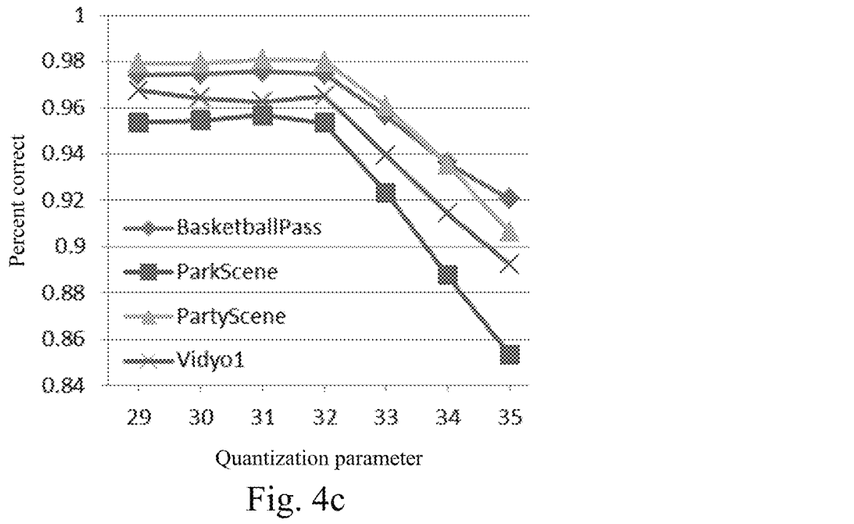
FIG. 4c shows a third PC curve diagram of the watermarking extraction of the BasketballPass, the ParkScene, the PartyScene and the Vidyol test sequences after the requantization transcoding attack when the original coding QP is 32 according to the preferred embodiments of the present invention.

The requantization transcoding destroys the compressed domain watermarking with a certain video quality loss and is one of the most common compressed video watermarking attack manners. The requantization transcoding is to process the video sequence with compressing and coding once again. According to the second preferred embodiment, the original coding QP of the test sequences are respectively 24, 28, and 32. FIG. 4a shows a first PC curve diagram of the watermarking extraction of the BasketballPass, the ParkScene, the PartyScene and the Vidyol test sequences after the requantization transcoding attack when the original coding QP is 24. FIG. 4b shows a second PC curve diagram of the watermarking extraction of the BasketballPass, the ParkScene, the PartyScene and the Vidyol test sequences after the requantization transcoding attack when the original coding QP is 28. FIG. 4c shows a third PC curve diagram of the watermarking extraction of the BasketballPass, the ParkScene, the PartyScene and the Vidyol test sequences after the requantization transcoding attack when the original coding QP is 32. The PC curve diagrams of the watermarking extraction, as showed in FIGS. 4a-4c, illustrate that the PC of the watermarking extraction changes with the different original coding QPs of the requantization transcoding. According to FIGS. 4a-4c, the PCs of the watermarking extraction of the method, provided by the present invention, are all over 85%, illustrating that the method provided by the present invention is able to resist the requantization transcoding attack within a certain range of the coding QP. In a range of [QP−3, QP], the PC has little change, mainly above 95%; and in a range of [QP+1, QP+3], the PC decreases obviously, and the lowest PC is 85.34%, mainly because an increase of the original coding QP has a relatively large influence on a rate distortion loss when determining a size of coding units.

Figure 5A:
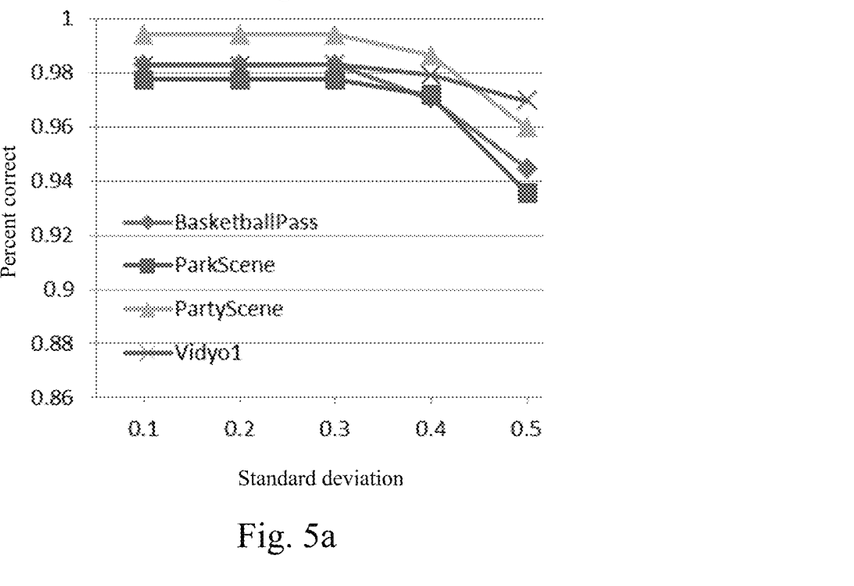
FIG. 5a shows a fourth PC curve diagram of the watermarking extraction of the BasketballPass, the ParkScene, the PartyScene and the Vidyol test sequences after a Gaussian blur and the requantization transcoding attack according to the preferred embodiments of the present invention.
Figure 5B:
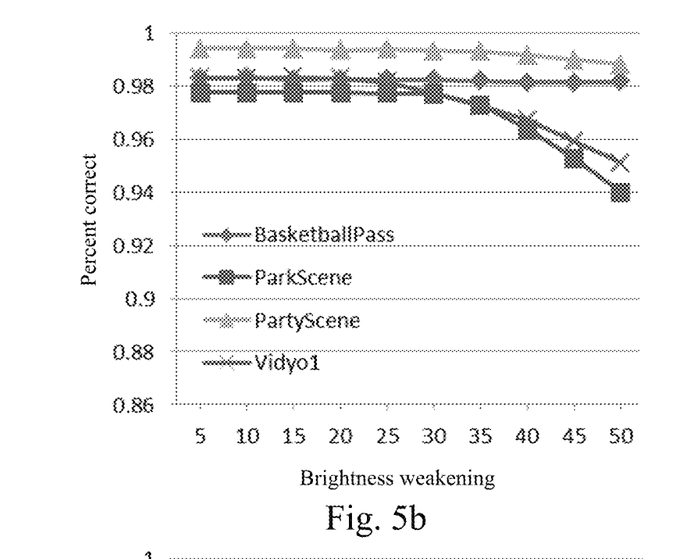
FIG. 5b shows a fifth PC curve diagram of the watermarking extraction of the BasketballPass, the ParkScene, the PartyScene and the Vidyol test sequences after brightness weakening and the requantization transcoding attack according to the preferred embodiments of the present invention.
Figure 5C:
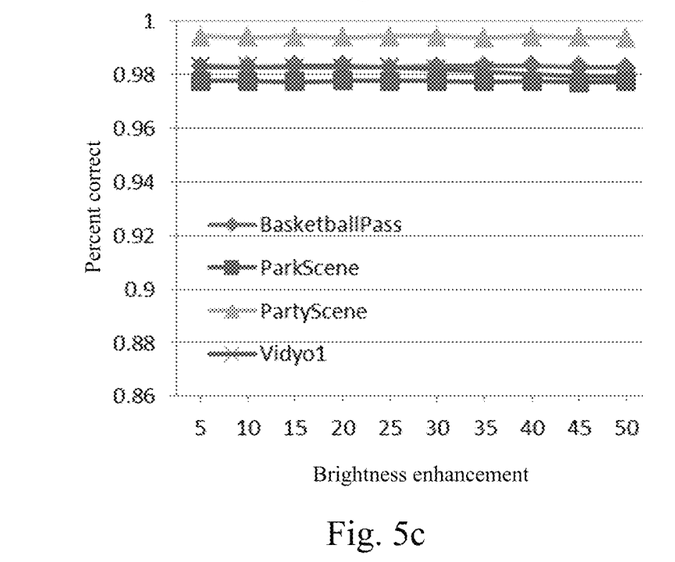
FIG. 5c shows a sixth PC curve diagram of the watermarking extraction of the BasketballPass, the ParkScene, the PartyScene and the Vidyol test sequences after brightness enhancement and the requantization transcoding attack according to the preferred embodiments of the present invention.
Figure 5D:
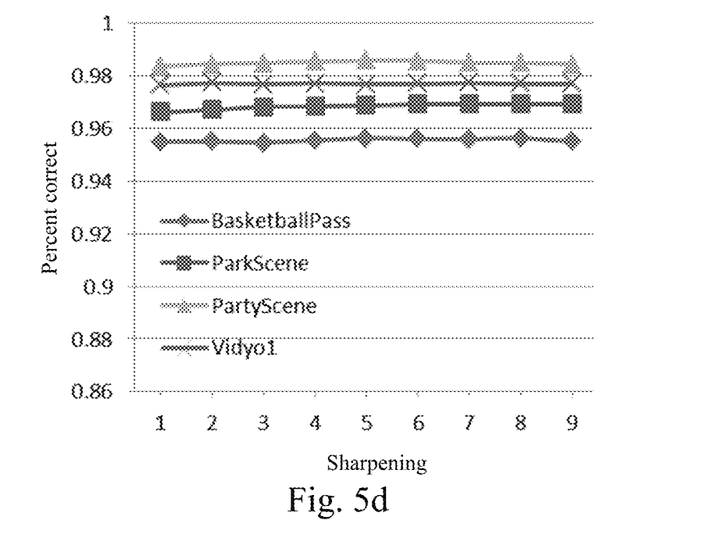
FIG. 5d shows a seventh PC curve diagram of the watermarking extraction of the BasketballPass, the ParkScene, the PartyScene and the Vidyol test sequences after sharpening and the requantization transcoding attack according to the preferred embodiments of the present invention.
Figure 5E:
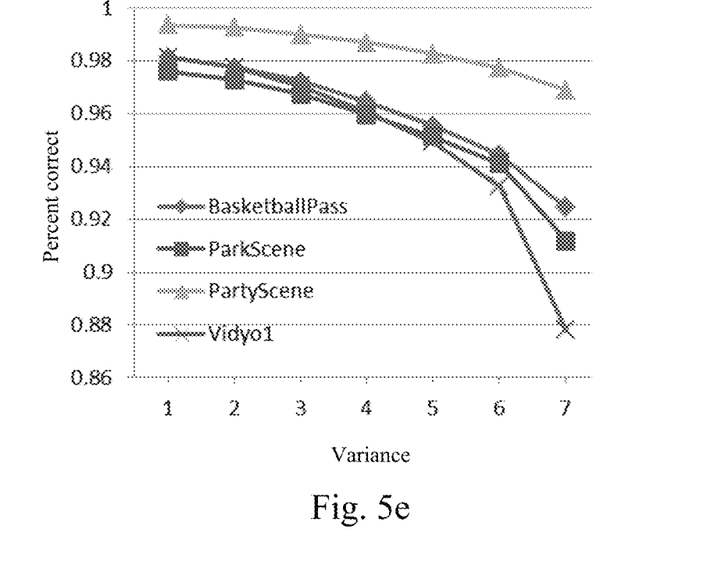
FIG. 5e shows an eighth PC curve diagram of the watermarking extraction of the BasketballPass, the ParkScene, the PartyScene and the Vidyol test sequences after a Gaussian noise treatment and the requantization transcoding attack according to the preferred embodiments of the present invention.

3) Robustness Against Signal Processing Combined with Requantization Transcoding Attack Test results of the robustness of the test sequences after processing with the various signal processing combined with the requantization transcoding attack of the same coding QP are showed in FIGS. 5a-5e. FIG. 5a shows a fourth PC curve diagram of the watermarking extraction of the BasketballPass, the ParkScene, the PartyScene and the Vidyol test sequences after a Gaussian blur and the requantization transcoding attack. FIG. 5b shows a fifth PC curve diagram of the watermarking extraction of the BasketballPass, the ParkScene, the PartyScene and the Vidyol test sequences after brightness weakening and the requantization transcoding attack. FIG. 5c shows a sixth PC curve diagram of the watermarking extraction of the BasketballPass, the ParkScene, the PartyScene and the Vidyol test sequences after brightness enhancement and the requantization transcoding attack. FIG. 5d shows a seventh PC curve diagram of the watermarking extraction of the BasketballPass, the ParkScene, the PartyScene and the Vidyol test sequences after sharpening and the requantization transcoding attack. FIG.

5e shows an eighth PC curve diagram of the watermarking extraction of the BasketballPass, the ParkScene, the PartyScene and the Vidyol test sequences after a Gaussian noise treatment and the requantization transcoding attack. According to FIG. 5a and FIG. 5d, the PC is above 93% at a certain degree of wave filtering, illustrating that the method provided by the present invention is able to resist a certain degree of the wave filtering. According to FIG. 5b and FIG. 5c, the PC is above 93% at a certain degree of brightness attack, illustrating that the method provided by the present invention is able to resist a certain degree of the brightness attack. According to FIG. 5e, the PC of the watermarking extraction is above 88%, illustrating that the method provided by the present invention is able to resist a certain degree of noise attack.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A zero-watermarking registration method for high efficiency video coding (HEVC) video streaming against requantization transcoding, comprising steps of:

①_1, at a watermarking registration port, compressing and coding an original video $V_{org}$ which is to be protected and has a resolution of M×N through an HEVC standard coding platform, so as to obtain a first target video streaming denoted as $str.bin_{org}$; arranging a first set D, and letting an initial value of the D be empty;

①_2, parsing each video frame of the $str.bin_{org}$, and defining an $f^{th}$ video frame to be parsed currently in the $str.bin_{org}$ as a first current frame, wherein: the f is an integer and has an initial value of 1; $1 \leq f \leq F$; and the F represents a total frame number of the video frames in the $str.bin_{org}$;

①_3, parsing each coding tree unit (CTU) of the first current frame, and defining a $b^{th}$ CTU to be parsed currently in the first current frame as a first current parsing block, wherein: the b is the integer and has the initial value of 1; $1 \leq b \leq B$; and the B represents a total number of the CTUs in the first current frame;

①_4, taking a brightness block having a size of 4×4 as a unit, orderly parsing out a depth value corresponding to each brightness block in the first current parsing block; and denoting the depth value corresponding to a $k^{th}$ brightness block in the first current parsing block as $d_{org}^{k}$, wherein the k is the integer and has the initial value of 1; $1 \leq k \leq 256$; and $d_{org}^{k} \in \{0,1,2,3\}$;

①_5, letting b=b+1, taking a next CTU to be parsed in the first current frame as the first current parsing block, and returning back to the step ①_4 to continue executing until all of the CTUs in the first current frame are parsed; and then executing step ①_6; wherein the "=" in b=b+1 is an assignment symbol;

①_6, letting f=f+1, taking a next video frame to be parsed in the $str.bin_{org}$ as the first current frame, and returning back to the step ①_3 to continue executing until all of the video frames in the $str.bin_{org}$ are parsed; and then executing step ①_7; wherein the "=" in f=f+1 is the assignment symbol;

①_7, orderly storing the respective depth value corresponding to each brightness block in the $str.bin_{org}$ into the D; and processing values of all elements in the D with a depth binarization, so as to obtain a second set denoted as D', wherein a total number of the elements in the D is S, S=F×B×256;

①_8, converting a copyright logo image $logo_{org}$ having a resolution of X×Y into a binary image denoted as $logo_{org}'$; and processing the $logo_{org}'$ with chaotic scrambling to obtain an image denoted as $logo_{org}''$; wherein $1 \leq X \times Y \leq F \times B \times 256$;

①_9, extracting X×Y elements from the D' according to a preset rule; orderly arranging the extracted X×Y elements into a first watermarking information matrix having a size of X×Y with a Zig-Zag scanning order; meanwhile, randomly generating a random matrix having the size of X×Y, wherein each element in the random matrix has a value of 0 or 1, and denoting the random matrix as $R_{org}$; processing a value of each element in the first watermarking information matrix and the value of the corresponding element in the $R_{org}$ with XOR, so as to obtain a first matrix which serves as a first encrypted watermarking information matrix, denoted as D*; and ①_10, processing a value of each element in the $logo_{org}''$ and a value of a corresponding element in the D* with XOR, so as to obtain a second matrix which serves as registration watermarking information, denoted as $W_{org}$; requesting a time certification authority to create a timestamp on the $W_{org}$, so as to obtain timestamped registration watermarking information denoted as $W_{org}'$; registering the $W_{org}'$ in an Intellectual Property Right (IPR) database which is established by a trusted third party, and meanwhile sending the $logo_{org}'$, the $R_{org}$ and the preset rule to a watermarking detection port; wherein in the step ①_7, the step of "processing values of all elements in the D with a depth binarization" comprises steps of:

①_7a, dividing the D into four subsets, respectively denoted as $G_0$, $G_1$, $G_2$ and $G_3$ wherein: the $G_0$ is a first subset orderly extracting all the elements having the value of 0 from the D; the $G_1$ is a second subset orderly extracting all the elements having the value of 1 from the D; the $G_2$ is a third subset orderly extracting all the elements having a value of 2 from the D; and the $G_3$ is a fourth subset orderly extracting all the elements having the value of 3 from the D;

①_7b, dividing the four subsets into two depth value sets in three different grouping manners, wherein:

a first group is denoted as $C_1$, $C_1 = \{F_1^1 = G_0, F_2^1 = G_1 \cup G_2 \cup G_3\}$, wherein: the $F_1^1$ represents a first depth value set in a first grouping manner; the $F_2^1$ represents a second depth value set in the first grouping manner; and the symbol "∪" is a union operational symbol;

a second group is denoted as $C_2$, $C_2 = \{F_1^2 = G_0 \cup G_1, F_2^2 = G_2 \cup G_3\}$, wherein: the $F_1^2$ represents a first depth value set in a second grouping manner; and the $F_2^2$ represents a second depth value set in the second grouping manner; and a third group is denoted as $C_3$; $C_3 = \{F_1^3 = G_0 \cup G_1 \cup G_2; F_2^3 = G_3\}$, wherein: the F represents a first depth value set in a third grouping manner; and the F represents a second depth value set in the third grouping manner; and ①_7c, adaptively choosing one group from the $C_1$, the $C_2$ and the $C_3$; mapping values of all the elements in the first depth value set of the chosen group into watermarking information "0"; and mapping values of all the elements in the second depth value set of the chosen group into watermarking information "1", so as to finish processing the values of all the elements in the D with the depth binarization;

in the step ①_7c, the step of "adaptively choosing one group from the $C_1$, the $C_2$ and the $C_3$" comprises steps of:

1_1), counting total numbers of the elements respectively in the $G_0$, the $G_1$, the $G_2$ and the $G_3$ respectively denoted as $S_0$, $S_1$, $S_2$ and $S_3$;

1-2), respectively calculating ratios of the $S_0$, the $S_1$, the $S_2$ and the $S_3$ to the S, respectively denoted as $P_0$, $P_1$, $P_2$ and $P_3$, wherein:

$$P_0 = \frac{S_0}{S}; P_1 = \frac{S_1}{S}; P_2 = \frac{S_2}{S}; \text{ and } P_3 = \frac{S_3}{S};$$

1_3), letting $P_{diff}(C_1)=|P_0-(P_1+P_2+P_3)|$, $P_{diff}(C_2)=|(P_0+P_1)-(P_2+P_3)|$, and $P_{diff}(C_3)=|(P_0+P_1+P_2)-P_3|$; wherein the symbol "||" is an absolute value symbol;

1_4), letting $C=C_2$; determining whether $P_{diff}(C)$ is larger than the $P_{diff}(C_3)$; if the $P_{diff}(C)$ is larger than the $P_{diff}(C_3)$, letting $C=C_3$, and then executing step 1-5); otherwise, remaining the C unchanged, and then executing the step 1-5); wherein the "=" in $C=C_3$ is the assignment symbol;

1-5) determining whether the $P_{diff}(C)$ is larger than a first threshold T; if the $P_{diff}(C)$ is larger than the first threshold T, executing step 1-6); otherwise, remaining the C unchanged, and adopting the C as a first final chosen group; and 1-6), determining whether the $P_{diff}(C)$ is larger than or equal to the $P_{diff}(C_1)$; if the $P_{diff}(C)$ is larger than or equal to the $P_{diff}(C_1)$, letting $C=C_1$, and adopting the C as the first final chosen group; otherwise, remaining the C unchanged, and adopting the C as the first final chosen group; wherein the "=" in $C=C_1$ is the assignment symbol;

and the first threshold T in the step 1-5) has a value of 0.4.

2. A zero-watermarking detection method for HEVC video streaming against requantization transcoding, which corresponds to the zero-watermarking registration method for the HEVC video streaming against the requantization transcoding as recited in claim 1, comprising steps of:

②_1, at the watermarking detection port, letting $V_{dec}$ denote an HEVC video to be detected which has the resolution of M×N and is compressed and coded through the HEVC standard coding platform; letting an obtained corresponding video streaming be a second target video streaming, denoted as $str.bin_{dec}$; arranging a third set $\hat{D}$, and letting an initial value of the $\hat{D}$ be empty;

②_2, parsing each video frame of the $str.bin_{dec}$, and defining an $f'^{th}$ video frame to be parsed currently in the $str.bin_{dec}$ as a second current frame, wherein: the f' the integer and has the initial value of 1; 1≤f'≤F'; the F' represents a total frame number of the video frames in the $str.bin_{dec}$; and the F' is equal to the F;

②_3, parsing each CTU of the second current frame, and defining a $b'^{th}$ CTU to be parsed currently in the second current frame as a second current parsing block, wherein: the b' is the integer and has the initial value of 1; 1≤b'≤B'; and the B' represents a total number of the CTUs in the second current frame;

②_4, taking the brightness block having the size of 4×4 as the unit, orderly parsing out a depth value corresponding to each brightness block in the second current parsing block; and denoting the depth value corresponding to a $k^{th}$ brightness block in the second current parsing block as $d_{dec}^k$, wherein: the k is the integer and has the initial value of 1; 1≤k≤256; and $d_{dec}^k \in \{0,1,2,3\}$;

②_5, letting b'=b'+1, taking a next CTU to be parsed in the second current frame as the second current parsing block, and returning back to the step ②_4 to continue executing until all of the CTUs in the second current frame are parsed; and then executing step ②_6; wherein the "=" in b'=b'+1 is the assignment symbol;

②_6, letting f'=f'+1, taking a next video frame to be parsed in the $str.bin_{dec}$ as the second current frame, and returning back to the step ②_3 to continue executing until all of the video frames in the $str.bin_{dec}$ are parsed; and then executing step ②_7; wherein the "=" in f'=f'+1 is the assignment symbol;

②_7, orderly storing the respective depth value corresponding to each brightness block in the $str.bin_{dec}$ into the $\hat{D}$; and processing values of all elements in the $\hat{D}$ with the depth binarization, so as to obtain a fourth set denoted as $\hat{D}'$, wherein a total number of the elements in the $\hat{D}$ is S', S'=F'×B'×256;

②_8, according to the preset rule which is sent to the watermarking detection port from the watermarking registration port, extracting X×Y elements from the $\hat{D}'$; orderly arranging the extracted X×Y elements into a second watermarking information matrix having the size of X×Y with the Zig-Zag scanning order; processing a value of each element in the second watermarking information matrix and the value of the corresponding element in the $R_{org}$ which is sent to the watermarking detection port from the watermarking registration port with XOR, so as to obtain a third matrix which serves as a second encrypted watermarking information matrix, denoted as $\hat{D}^*$; wherein 1≤X×Y≤F'×B'×256;

②_9, processing a value of each element in the $\hat{D}^*$ and a value of a corresponding element in the $W_{org}'$ of the IPR database which is established by the trusted third party with XOR, so as to obtain a fourth matrix which serves as copyright logo information, denoted as $logo_{dec}"$; and processing the $logo_{dec}"$ with chaotic anti-scrambling to obtain an image denoted as $logo_{dec}'$; and ②_10, comparing the $logo_{dec}'$ with the $logo_{org}'$ which is sent to the watermarking detection port from the watermarking registration port; if the $logo_{dec}'$ and the $logo_{org}'$ are consistent, finishing a copyright authentication:

in the step ②_7, the step of "processing values of all elements in the $\hat{D}$ with the depth binarization" comprises steps of:

②_7a, dividing the $\hat{D}$ into four subsets, respectively denoted as $\hat{G}_0$, $\hat{G}_1$, $\hat{G}_2$ and $\hat{G}_3$, wherein: the $\hat{G}_0$ is a fifth subset orderly extracting all the elements having the value of 0 from the $\hat{D}$; the $\hat{G}_1$ is a sixth subset orderly extracting all the elements having the value of 1 from the $\hat{D}$; the $\hat{G}_2$ is a seventh subset orderly extracting all the elements having the value of 2 from the $\hat{D}$; and the $\hat{G}_3$ is an eighth subset orderly extracting all the elements having the value of 3 from the $\hat{D}$;

②_7b, dividing the four subsets into two depth value sets in three different grouping manners, wherein:

a fourth group is denoted as $\hat{C}_1$, $\hat{C}_1=\{\hat{F}_1^1=\hat{G}_0, \hat{F}_2^1=\hat{G}_1\cup\hat{G}_2\cup\hat{G}_3\}$, wherein: the $\hat{F}_1^1$ represents a first depth value set in a fourth grouping manner; the $\hat{F}_2^1$ represents a second depth value set in the fourth grouping manner; and the symbol "∪" is the union operational symbol;

a fifth group is denoted as $\hat{C}_2$, $\hat{C}_2=\{\hat{F}_1^2=\hat{G}_0\cup\hat{G}_1, \hat{F}_2^2=\hat{G}_2\cup\hat{G}_3\}$, wherein: the $\hat{F}_1^2$ represents a first depth value set in a fifth grouping manner; and the $\hat{F}_2^2$ represents a second depth value set in the fifth grouping manner; and a sixth group is denoted as $\hat{C}_3$, $\hat{C}_3=\{\hat{F}_1^3=\hat{G}_0\cup\hat{G}_1\cup\hat{G}_2, \hat{F}_2^3=\hat{G}_3\}$, wherein: the $\hat{F}_1^3$ represents a first depth value set in a sixth grouping manner; and the $\hat{F}_2^3$ represents a second depth value set in the sixth grouping manner; and ②_7c, adaptively choosing one group from the $\hat{C}_1$, the $\hat{C}_2$ and the $\hat{C}_3$; mapping values of all the elements in the first depth value set of the chosen group into the watermarking information "0"; and mapping values of all the elements in the second depth value set of the chosen group into the watermarking information "1", so as to finish processing the values of all the elements in the $\hat{D}$ with the depth binarization;

in the step ②_7c, the step of "adaptively choosing one group from the $\hat{C}_1$, the $\hat{C}_2$ and the $\hat{C}_3$" comprises steps of:

2_1), counting total numbers of the elements respectively in the $\hat{G}_0$, the $\hat{G}_1$, the $\hat{G}_2$ and the $\hat{G}_3$, respectively denoted as $\hat{S}_0$, $\hat{S}_1$, $\hat{S}_2$ and $\hat{S}_3$;

2-2), respectively calculating ratios of the $\hat{S}_0$, the $\hat{S}_1$, the $\hat{S}_2$ and the $\hat{S}_3$ to the S', respectively denoted as $\hat{P}_0$, $\hat{P}_1$, $\hat{P}_2$ and $\hat{P}_3$, wherein:

$$\hat{P}_0 = \frac{\hat{S}_0}{S'}; \hat{P}_1 = \frac{\hat{S}_1}{S'}; \hat{P}_2 = \frac{\hat{S}_2}{S'}; \text{and } \hat{P}_3 = \frac{\hat{S}_3}{S'};$$

2_3), letting $P_{diff}(\hat{C}_1)=|\hat{P}_0-(\hat{P}_1+\hat{P}_2+\hat{P}_3)|$, $P_{diff}(\hat{C}_2)=(\hat{P}_0+\hat{P}_1)-(\hat{P}_2+\hat{P}_3)|$, and $P_{diff}(\hat{C}_3)=|(\hat{P}_0+\hat{P}_1+\hat{P}_2)-\hat{P}_3|$; wherein the symbol "||" is the absolute value symbol;

2_4), letting $\hat{C}=\hat{C}_2$; determining whether $P_{diff}(\hat{C})$ is larger than the $P_{diff}(\hat{C}_3)$; if the $P_{diff}(\hat{C})$ is larger than the $P_{diff}(\hat{C}_3)$, letting $\hat{C}=\hat{C}_3$, and then executing step 2-5); otherwise, remaining the $\hat{C}$ unchanged, and then executing the step 2-5); wherein the "=" in $\hat{C}=\hat{C}_3$ is the assignment symbol;

2-5) determining whether the $P_{diff}(\hat{C})$ is larger than a second threshold T'; if the $P_{diff}(\hat{C})$ is larger than the second threshold T', executing step 2-6); otherwise, remaining the $\hat{C}$ unchanged, and adopting the $\hat{C}$ as a second final chosen group; and 2-6), determining whether the $P_{diff}(\hat{C})$ is larger than or equal to the $P_{diff}(\hat{C}_1)$; if the $P_{diff}(\hat{C})$ is larger than or equal to the $P_{diff}(\hat{C})$, letting $\hat{C}=\hat{C}_1$, and adopting the $\hat{C}$ as the second final chosen group; otherwise, remaining the $\hat{C}$ unchanged, and adopting the $\hat{C}$ as the second final chosen group; wherein the "=" in $\hat{C}=\hat{C}_1$ is the assignment symbol;

and the second threshold T' in the step 2-5) has the value of 0.4.

* * * * *